United States Patent
Lamadrid

[11] 3,900,396
[45] Aug. 19, 1975

[54] BLOOD LEAK DETECTOR
[75] Inventor: Rene G. Lamadrid, Bethesda, Md.
[73] Assignee: Baxter Laboratories, Inc., Morton Grove, Ill.
[22] Filed: Mar. 22, 1974
[21] Appl. No.: 453,751

[52] U.S. Cl. ............... 210/94; 210/321; 250/575
[51] Int. Cl.² ............................................. B01D 35/14
[58] Field of Search ........... 210/85, 22, 94, 96, 321; 73/61.4; 250/573, 574, 575, 576, 565

[56] References Cited
UNITED STATES PATENTS

| | | | |
|---|---|---|---|
| 2,756,626 | 7/1956 | Lansing et al. | 210/85 |
| 3,422,443 | 1/1969 | Jansen | 73/61.4 |
| 3,489,906 | 1/1970 | Beer | 250/575 |
| 3,490,591 | 1/1970 | Jones et al. | 210/85 |
| 3,506,126 | 4/1970 | Serfass et al. | 210/96 |
| 3,511,227 | 5/1970 | Johnson | 250/575 |
| 3,787,703 | 1/1974 | Topol | 250/574 |
| 3,812,482 | 5/1974 | Clark | 250/573 |
| 3,817,623 | 6/1974 | Fruengel | 250/574 |
| 3,838,774 | 10/1974 | Dolan | 210/85 |

*Primary Examiner*—Theodore A. Granger
*Attorney, Agent, or Firm*—Herman L. Gordon; Richard G. Kinney

[57] ABSTRACT

A blood leak detector for use with artificial kidney machines. A transparent conduit through which dialysate circulates extends through a block. The block contains a lamp whose light passes through a first channel in the block transversely intersecting the conduit and a second channel in the block at an angle to the first channel and about the same length, avoiding the conduit. Identical 550–560 nm filters and photovoltaic cells are provided at the ends of the channels. The channels provide relatively wide dispersion angles. Circuitry is provided to measure the differential response of the photovoltaic cells and express this in terms of a voltage. An excessive difference between this voltage and a reference voltage will operate an alarm or emergency device. An adjustable light-obstructing screw is provided in the second channel for purposes of calibration.

10 Claims, 3 Drawing Figures

BLOOD LEAK DETECTOR

This invention relates to leak detection devices, and more particularly to a blood leak detector for use with an artificial kidney machine.

A main object of the invention is to provide a novel and improved apparatus for detecting blood leakage in dialysate from an artificial kidney machine, the apparatus being of simple construction, being reliable in operation, and being usable over long periods of time without requiring frequent recalibration.

A further object of the invention is to provide an improved optical blood leak detection apparatus wherein leakage of blood in the dialysate from an artificial kidney machine will be accurately detected without interference from the presence of urea and other contaminants, wherein thermal effects from the detection light beams will be substantially balanced out, and wherein the apparatus includes heat sink means to maintain an even temperature.

A still further object of the invention is to provide an improved optical blood leak detection apparatus for continuously observing the dialysate from an artificial kidney machine and for providing actuation of an alarm or other emergency device when blood leakage is detected, the apparatus employing relatively wide optical channels allowing substantial divergence of the light rays, so that bubbles in the dialysate will not cause false actuation, while at the same time the apparatus is relatively compact and is mechanically rugged, and wherein the apparatus includes relatively simple and easily operated optical calibration means.

A still further object of the invention is to provide an improved optical blood leak detection apparatus for optically monitoring dialysate from an artificial kidney machine, the apparatus being stable in operation, employing a light source having a large amount of emission at a wavelength corresponding to that of an absorbance peak of oxygenated hemoglobin, so that a large wattage source is not required, and employing relatively simple and inexpensive electrical components in its detection circuit.

Further objects and advantages of the invention will become apparent from the following description and claims, and from the accompanying drawings, wherein:

Figures 1, 2:
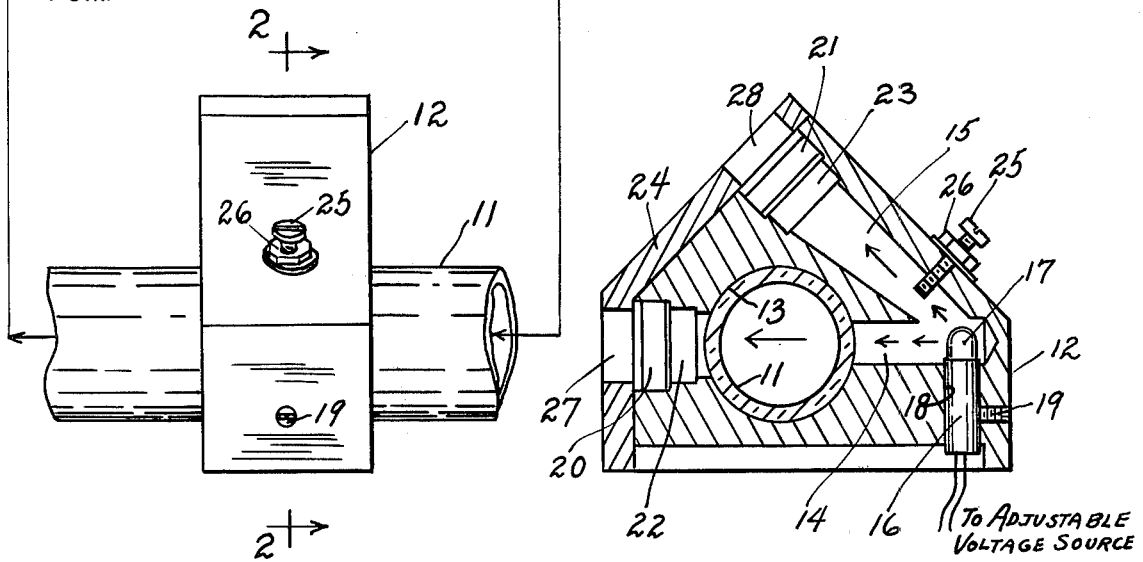
FIG. 1 is an elevational view of an optical block assembly forming part of a blood leakage detection apparatus according to the present invention, shown mounted on a transparent dialysate conduit associated with an artificial kidney machine.
FIG. 2 is a transverse vertical cross-sectional view taken substantially on the line 2—2 of FIG. 1.

Referring to the drawings, 11 designates a transparent conduit through which dialysate from an artificial kidney machine circulates. Designated at 12 is a metal block, such as a block of aluminum, or the like, having a bore 13 closely receiving the conduit 11. The block is formed with respective passages defining a pair of diverging, relatively large-area light channels 14 and 15, the channel 14 transversely intersecting the bore 13 and thus traversing the conduit 11, as shown in FIG. 2. Adjustably mounted in the corner portion of the block adjacent the intersection of the light channels 14 and 15 is a lamp socket 16 containing a small lamp 17, the socket being adjustably secured in its mounting bore 18 by means of a set screw 19 so that the lamp filament may be located substantially at the intersection of the optical axes of the diverging light channels 14 and 15.

Mounted in the light channels at their outer end portions are respective identical photovoltaic cells 20 and 21, such as conventional silicon cells, known as "solar cells," and mounted in the light channels immediately ahead of the cells are respective identical 550–560 nm filters 22,23, which pass radiant energy at a wavelength corresponding to a secondary absorption peak of oxygenated hemoglobin.

The absorption spectrum of arterial blood, which is essentially that of oxygenated hemoglobin, shows peaks at 415, 550 and 573 nanometers. While the absorbance at 415 nm is much greater than the absorbance at either 550 or 573 nm, at 415 nm there is likelihood of confusion with the optical effects of urea or other contaminants, whereas this likelihood of confusion is not present at 550 nm.

A conformably shaped retaining plate 24 is suitably secured on block 12 over the cells 20 and 21, said retaining plate having apertures 27 and 28 for the cell lead wires.

An adjustable light-obstructing calibrating screw 25 is threadedly engaged through the wall of channel 15 adjacent the channel intersection, said screw being provided with a locknut 26.

The light channels 14 and 15 are approximately the same in total effective length. The elements are so located in the aluminum block 12 that the heating effect of the lamp 17 and/or temperature of the dialysate affect both photodetectors 20 and 21 equally, thus compensating for thermal variations.

The lamp location is such that rays leaving the lamp in the plane perpendicular to the axis of flow tube 11 will, after refraction through the transparent walls of the tube and the liquid dialysate therein, emerge from the flow tube parallel or only slightly convergent. Thus, the lamp is at a distance from the tube corresponding substantially to the focal length of the equivalent lens defined by the transparent tube and its contents. In a typical design, the channels are of sufficient diameter so that a solid angle of approximately 25° of the lamp's illumination flux reaches the photodetectors 20,21 through the filters 22,23. In said typical design, the path through the liquid is about 19 mm long and has an average cross-sectional width of 10 mm. The beam of light through the liquid is relatively wide, which reduces the effect of bubbles, which may have a mean diameter of about 1 mm, and are therefore small by comparison with the beam width. Vortex effects in the tube also are of the order of 1 mm in diameter or less, and therefore have small effect on the relatively wide monitoring beam. In this design the distance from tube 11 to photodetector 20 was quite small, of the order of 6 mm., to minimize the effect of light scattered by particles in suspension.

The thickness of the block 12 in the typical design was made quite small, namely, of the order of ¾ inch, because of space limitations. However, the block 12 was of sufficient mass to serve as a heat sink to thereby maintain an even temperature.

The bulb 17 is preferably of a type providing high output at the measure wavelength, namely, 540–570 nm., so that its normal operation does not require excessive wattage.

Figure 3:
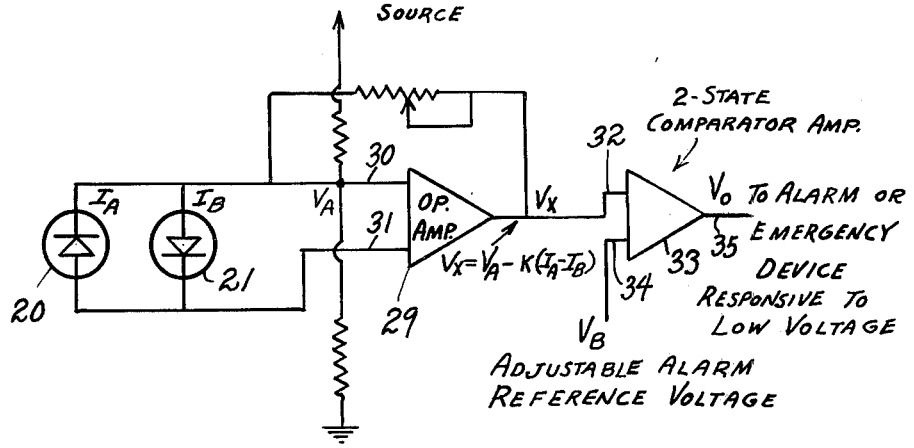
FIG. 3 is a schematic diagram of an electrical circuit employed with the optical block assembly of FIGS. 1 and 2, in accordance with the present invention.

FIG. 3 shows a typical alarm circuit including the photovoltaic cells 20,21. As shown, the cells are connected in opposition to the respective inputs 30,31 of a conventional operational amplifier 29. A reference voltage $V_A$ is applied to the input 30. The output voltage $V_X$ of the amplifier 29 will then be given by $$V_X = V_A - K(I_A - I_B) \text{ where}$$

$I_A$ is the output current of cell 20, $I_B$ is the output current of cell 21, and K is a constant The output voltage $V_X$ is applied to one of the inputs 32 of a 2-state voltage comparator amplifier 33. A reference voltage $V_B$ is applied to the other input 34 of amplifier 33.

The comparator amplifier 33 is of a type such that when $V_X$ is greater than $V_B$ the output voltage $V_O$ at the output 35 will be relatively low, of the order of 1 volt, whereas when $V_X$ is less than $V_B$ the output voltage $V_O$ will be relatively high, of the order of 17 volts. The alarm or other emergency device is of a type activated in response to the low (1 volt) output voltage, and is not activated when the high (17 volt) output is present at 35. Thus, when $V_X$ increases to a value greater than $V_B$, the output voltage $V_O$ drops from its normal (17 volt) high value to its alarm-state low voltage (1 volt) value.

The reference voltage $V_B$ at input 34 may be suitably adjusted to provide a desired alarm voltage threshold.

The presence of more than a predetermined amount of hemoglobin in tube 11 will therefore increase $V_X$ sufficiently from its normal value to exceed $V_B$ and cause $V_O$ to drop from its normal high value to its alarm-state low value.

To calibrate the device, with cell 21 disconnected and with clear liquid in tube 11, the device is stabilized to obtain a nominal current $I_A$, measured in any suitable manner, for example, of the order of 38 microamperes, while adjusting the lamp voltage. Cell 21 is then reconnected and screw 25 is adjusted to obtain a nominal balance current $I_A - I_B$, for example, of the order of 8 microamperes.

In operation, when blood is present in the dialysate in tube 11, absorption will reduce the filtered light reaching cell 20, causing a drop in $I_A$ and thereby increasing $V_X$. When the value $I_A - I_B$ reaches an alarm value, for example, 3.5 microamperes, $V_X$ exceeds $V_B$, causing the output voltage $V_O$ of amplifier 33 to drop to its alarm-state low voltage value and thus activate the alarm or other emergency device.

As above mentioned, the alarm reference voltage $V_B$ may be adjusted to allow a desired threshold before activation of the alarm or emergency device.

Failure of lamp 17 will deactivate the cells 20,21 and will likewise cause an increase of $V_X$ sufficient to activate the alarm or other emergency device.

While a specific embodiment of an improved blood leakage detector for an artificial kidney machine has been disclosed in the foregoing description, it will be understood that various modifications within the spirit of the invention may occur to those skilled in the art. Therefore it is intended that no limitations be placed on the invention except as defined by the scope of the appended claims.

What is claimed is:

1. In an artificial kidney machine, a blood leakage detector comprising a transparent flow conduit containing dialysate from the artificial kidney machine, an opaque block of heat-absorbing material having a bore closely receiving said conduit, said block being formed with a pair of intersecting divergent light passages, one of said passages traversing said conduit substantially perpendicularly thereto and the other being clear of the conduit and defining an independent clear reference passage, a light source mounted in the block at the intersection of said passages, respective photosensitive elements mounted in the block at the end portions of said passages, and alarm circuit means operatively connected to said photosensitive elements and operating responsive to differences in intensity of the light reaching said photosensitive elements through said passages caused by light absorbance due to the presence of blood in the flow conduit.

2. The artificial kidney machine of claim 1, and wherein said photosensitive elements comprise photovoltaic cells generating currents in accordance with the intensities of the light reaching them through said passages, and wherein said alarm circuit means includes means to respond to the difference between the currents generated in said cells.

3. The artificial kidney machine of claim 2, and respective filters mounted in the block adjacent to and ahead of the photovoltaic cells, said filters being identical and being of a type passing peak absorption wavelengths of oxygenated hemoglobin.

4. The artificial kidney machine of claim 3, and wherein said filters are of a type passing between approximately 540 and approximately 570 nm.

5. The artificial kidney machine of claim 4, and adjustable light-obstructing means in said reference passage for calibrating the detector.

6. The artificial kidney machine of claim 5, and wherein said adjustable light-obstructing means comprises a member threaded through the wall of said reference passage and projecting into the reference passage.

7. The artificial kidney machine of claim 6, and wherein said source is located at a point such that it is substantially at the focal distance from the equivalent lens defined by the conduit and its contents.

8. The artificial kidney machine of claim 7, and wherein said adjustable light-obstructing means comprises a screw threadedly engaged through the wall of said reference passage.

9. The artificial kidney machine of claim 8, and wherein said screw is located adjacent the intersection of said passages.

10. The artificial kidney machine of claim 9, and means to adjust the position of the light source in the block so as to locate the light source substantially at the intersection of the optical axes of said passages.

* * * * *